United States Patent

Beer et al.

[11] Patent Number: 5,855,717
[45] Date of Patent: Jan. 5, 1999

[54] PROCESS FOR PRODUCING ANTIREFLECTION-TREATED SURFACES

[75] Inventors: Ekkehard Beer, Bad Schwalbach; Hermann Dallmann; Hajo Hagens, both of Wiesbaden, all of Germany

[73] Assignee: Hoechst Aktiengesellschaft, Frankfurt am Main, Germany

[21] Appl. No.: 838,345

[22] Filed: Feb. 20, 1992

[30] Foreign Application Priority Data

Sep. 21, 1991 [DE] Germany ............ 41 31 517.0

[51] Int. Cl.⁶ ............................ B44C 1/16
[52] U.S. Cl. .................... 156/240; 156/230; 264/220; 264/284; 264/293; 430/950
[58] Field of Search .................. 156/230, 231, 156/235, 234, 238, 240; 264/293, 284, 219, 220; 430/950

[56] References Cited

U.S. PATENT DOCUMENTS

| | | | |
|---|---|---|---|
| 3,697,277 | 10/1972 | King | 96/50 |
| 3,852,133 | 12/1974 | Houston | 264/219 X |
| 4,153,654 | 5/1979 | Maffitt et al. | 264/220 X |
| 4,517,235 | 5/1985 | Ungar et al. | 156/230 |
| 4,735,854 | 4/1988 | Lauchenauer | 156/230 |
| 4,881,999 | 11/1989 | Balmer et al. | 156/231 |
| 4,937,030 | 6/1990 | Nishiyama et al. | 264/219 X |

FOREIGN PATENT DOCUMENTS

| | | |
|---|---|---|
| 0 463 333 | 1/1992 | European Pat. Off. . |
| 0 483 676 | 5/1992 | European Pat. Off. . |
| 38 31 503 | 3/1990 | Germany . |
| 40 348 69.5 | 10/1990 | Germany . |
| 40 15 658 | 11/1991 | Germany . |

OTHER PUBLICATIONS

Ullmanns Encyclopedia of Industrial Chemistry, 4th revised and expanded ed., (1976) pp. 673–686.
Encyclopedia of Polymer Science and Engineering (1973) 7:73–87, Fibers, Optical to Hydrogenation.

*Primary Examiner*—James Sells
*Attorney, Agent, or Firm*—Foley & Lardner

[57] ABSTRACT

A process for producing an article by transferring to at least one surface of the article, a surface structure of a polymeric film, the surface structure comprising individual, randomly distributed elevations, so that the resultant article comprises the surface structure or a mirror image of the surface structure, the transferring comprising: a) applying the film to the article as a cover layer wherein a surface of the film comprising the structure faces outward from the article; or b) transferring the surface structure of the film to the article by applying a surface of the film having the structure to the article, so as to form a mirror-image of the structure on the molded body, and optionally removing the film; the process produces an article having at least one surface which exhibits antireflection properties.

17 Claims, No Drawings

PROCESS FOR PRODUCING ANTIREFLECTION-TREATED SURFACES

BACKGROUND OF THE INVENTION

The invention relates to a process for producing antireflection-treated surfaces, in which process a surface structured film is used.

In order to achieve certain optical effects, in particular, the avoidance of light reflections which often occur in objects made of, for example, plastic, metal, glass, or even high-quality high-gloss paper, the surfaces of such objects must have a certain roughness profile, so that incident light is not reflected, but refracted.

Normally, in particular in the case of plastics, suitable roughnesses are achieved by adding inert particles having a suitable particle size to the matrix of the objects. Another method includes machining the surface concerned mechanically by brushing or by using grinding units. In the case of metals, an anodic roughening process can be used. The addition of inert substances is not always desirable because this impairs the overall optics and mechanical properties of the object because the inert particles are not only present at the surface, where they should manifest the desired effect, but, distributed over the entire mass of the object. The mechanical machining of the surface is also not always the optimum solution because large quantities of abraded material is produced resulting in malfunctions during operation. Furthermore, the material can generally not be completely removed.

SUMMARY OF THE INVENTION

An object of the invention was therefore to develop a method which eliminates the disadvantages described above and can be carried out simply and inexpensively, with the aim of avoiding light reflections at the smooth surface of objects. Such a surface which avoids light reflection is termed an antireflection surface.

It is a further object of the invention to provide an article which has at least one surface which exhibits excellent antireflection properties, that is, the surface refracts most of the light, rather than reflects it.

In accomplishing the foregoing objectives, there has been provided, in accordance with one aspect of the present invention, a process for producing an article having at least one surface which exhibits antireflection properties, comprising the step of:

a) transferring to at least one surface of an article, a surface structure of a polymeric film, the surface structure comprising individual, randomly distributed elevations, so that the resultant article comprises the surface structure or a mirror image of the surface structure, the transferring comprising
  i) applying the film to the article as a cover layer wherein a surface of the film comprising the structure faces outward from the article, or
  ii) transferring the surface structure of the film to the article by applying a surface of the film having the structure to the article, so as to form a mirror-image of the structure on the article, and optionally removing the film.

In accordance with another aspect of the present invention there has been provided articles having anti-reflective properties produced by the above process.

Further objects, features, and advantages of the invention will become apparent from the detailed description of preferred embodiments that follows.

DETAILED DESCRIPTION OF THE PREFERRED EMBODIMENTS

The process of the present invention comprises applying film, having at least one layer, i.e., a monolayer or multilayer film, to the article, which is preferably a molded body, to be antireflection-treated or by transferring the surface structures of the film in mirror-image form to the surface of the molded body. The surface-structured film preferably has, at least on one side, a basic structure composed of a polymer of the molded body, from which basic structure, individual, randomly distributed elevations project. The elevations may be produced in the film in any known manner, and are preferably due to the presence of at least one of inert, inorganic, and organic additives.

Any known additives can be used in any desired amount so long as the film has the surface structures necessary to obtain the inventive results. The additives are preferably particles, preferably have a mean diameter of from 0.001 to 5 $\mu$m, more preferably from 0.05 to 2.5 $\mu$m, and are present in the film in a preferred amount of 0.005 to 5% by weight, more preferably from 0.005 to 1% by weight. The particles are preferably an inert particle, such as kaolin.

The basic structure of the film preferably comprises many mutually linked individual structures, wherein the individual structures have a substantially uniform configuration arranged in the longitudinal and transverse directions. The concept of a "substantially uniform configuration" is to be understood within the scope of the present invention as a structuring in which the individual structural elements are not arranged irregularly and in a purely random fashion alongside one another. In their important geometrical dimensions, in the shape and position in the plane, in the size and in the elevation above the film plane, they should be similar to such an extent that an unprejudiced observer is given the impression of a regularity due to the continually repeating elementary cells of the structure.

The mean diameter $d_m$ of the elementary cells should, preferably be in the range from 10 to 800 $\mu$m, more preferably from 20 to 400 $\mu$m, the mean diameter being determined in accordance with the following formula:

$$d_m = \frac{d_{max} + d_{min}}{2}$$

where
  $d_{max}$=Diameter of the elementary cell at the widest point and
  $d_{min}$=Diameter of the elementary cell at the narrowest point.

At the same time, the length to width ratio of the elementary cells is preferably in the region of $$0.1 \leq \frac{d_{min}}{d_{max}} \leq 1.0$$

The basic structure of the film is formed so that the deformations of the surface preferably rise about 0.01 to about 15.0 $\mu$m, more preferably 0.1 to 5.0 $\mu$m, above the lowest regions of the surface.

Films of this type useful in the instant process have been proposed in DE-A-4,015,658 and in DE-A-4,034,869, which correspond to U.S. patent application Ser. Nos. 07/700,669 and 07/785,603, which are hereby expressly incorporated by reference in their entirety.

DE-A-4,015,658 describes a biaxially stretched, heat-set film made of a thermoplastic, wherein said film has at least on one surface a surface roughness of greater than 0.003 microns. These films are useful as the films in the process of the present invention.

DE-A-4,034,869 describes a substrate having at least one surface which is textured with statistically distributed elevations. This substrate is useful as the film used during the process of the present invention.

The present invention relates to the application of such a film in a process for producing antireflection-treated surfaces. Said application may, according to the invention, be carried out in any known way so long as the produced article has an antireflection surface. In the simplest embodiment of the invention, the film is applied by any known process as a covering layer to the surface which is to be antireflection-treated using adhesion promoters. As an alternative to using an external adhesion promoter, the film may already be provided during the production process with an adhesion-promoting layer which has been applied, for example, by means of in-line coating or coextrusion. In this case, the film can be applied directly to the surface to be antireflection treated under the action of heat and pressure. If, in the case of the film, both sides do not have the characteristic surface structure, the film should be applied in such a way that the side having the structuring points outward and the smooth side, which does not have any surface structuring, faces the surface, to be antireflection treated, of the object.

In a further embodiment of the invention, a decorative layer is applied to the structured surface of the film, and said decorative layer is then transferred over the whole surface or partially to the surface, to be antireflection treated, of the object, preferably with the concomitant action of a further adhesive layer which can be activated by heat and/or pressure. The surface of the decorative layer which is exposed after the transfer has a surface structuring which is a precise negative image of the structuring of the film itself. In this way, antireflection-treated lettering or diagrams can be transferred to backings and an optical appearance can be produced which appeals to the aesthetic sense of the observer in a particularly pleasant way.

In a third embodiment of the process according to the invention, one or both surfaces can be antireflection treated in the case of, for example, objects made of plastic material such as glass-fiber-reinforced plastic panels or melamine resin panels, during panel production by using the film with the surface structuring during the pressing of the panels as a release film which is optionally peeled off after pressing and curing and yields a mirror-image surface structuring on the panel compared with the film.

The objects whose surface is antireflection treated according to the invention may be composed of a wide variety of materials including plastic, glass, metal, paper, cardboard, lacquered wood, and highly polished ceramic materials.

The film may be made of various natural and synthetic polymers including cellulose, cellulose ester, polyvinyl chloride, polystyrene, styrene copolymers, polycarbonate, polymers and copolymers of olefins such as ethylene, propylene, butylene, methylpentene etc., polysulfone, aliphatic and aromatic polyesters, polyimides, polyisobutylene, polymethyl methacrylate, polyphenylene sulfide, polyurethane, polyamide, polyaryl ether ketone, polyaryl ether ether ketone, polyaryl ether sulfone, polyamideimide, polyetherimide, and other known polymers such as described in Ullmans Encyclopedia of Industrial Chemistry, Verlag Chemie, Weinheim, 4th revised and expanded edition (1976), page 673 et seq.; and Encyclopedia of Polymer Science and Eng., Vol. 7, John Wiley & Sons (1973), pages 73 et seq.

The films are preferably stretched either biaxially or monoaxially, and then heat-set.

Due to the greater variation possibilities in the surface structuring of the film used, the process claimed according to the invention, in contrast to the prior art processes, enables the optical properties such as turbidity, gloss, and reflectivity of the molded bodies to be adjusted within wide limits.

In the exemplary embodiments below, polyester-based films are used which are equipped with the surface structures described above. In this connection, the use of polyester-based films does not represent any restriction of the invention, but is merely a representation or embodiment of the present invention.

The parameters specified in the examples have been determined as follows:

a) Determination of the Surface Structures of the Films, i.e., the Geometry of the Mutually Linked Elementary Cells The widest and the narrowest diameter ($d_{max}$; $d_{min}$) of an elementary cell is determined by means of differential interference contrast micrographs. The mean distance between the highest and the deepest point of an elementary cell was determined by means of a Hommel instrument T20 DC, 50 adjacent individual traces of the structured surface of the film being taken.

b) Gloss Measurement

The gloss measurement was carried out in accordance with DIN 67 530 at an angle of 20° and 60° on a black glass panel (refractive index n=1.567).

c) Surface Turbidity

The surface turbidity is the difference between the total turbidity and the bulk turbidity, the total turbidity being determined according to ASTM 1003-52 and the bulk turbidity by completely embedding the film in microscope immersion oil [refractive index ($n_D^{20}$) about 1.516] supplied by Merck, Darmstadt.

A sheet having a thickness of 0.35 mm which was produced from a high-purity, completely additive-free polyester was used as the molded body to be antireflection treated.

The gloss of this molded body was uniform in all directions being 184 at a 60° angle of measurement and 118 at an 85° angle of measurement.

EXAMPLE 1

A 36 μm thick additive-free polyester film which was produced by closely following Illustrative Example 1 in DE-A-4,034,869 and which has, on one of its surfaces, structures in the form of mutually linked elementary cells having $d_{max}$ of approximately 350 μm and $d_{min}$ of approximately 120 μm and a maximum distance between lowest and highest regions in said cells of 4 μm was laminated onto the molded body so that said structures face upward, using a polyester-based adhesion promoter. After laminating said film on, the gloss of said molded body was 79 in the first direction at a 60° angle of measurement and 33 at an 85° angle of measurement, the first direction corresponding to the direction of the longitudinal orientation of the film, and in the direction perpendicular thereto it was 140 at a 60° angle of measurement and 87 at an 85° angle of measurement.

EXAMPLE 2

A 9 μm thick polyester film was produced by closely following Illustrative Example 1 in DE-A-4,034,869 and was equipped with 300 ppm of kaolin having a mean diameter of 1.5 μm and which has, on one of its surfaces, structures in the form of mutually linked elementary cells having $d_{max}$ of approximately 420 μm and $d_{min}$ of approximately 290 μm and a maximum distance between lowest and highest regions of said cells of 1.2 μm. As comparative results have shown, a film having elevations of about 0.1 μm is produced, wherein the individual elevations are caused by the inert additive and wherein the elevations are randomly distributed over the film surface. The film was applied in accordance with Illustrative Example 1 to the molded body to be antireflection treated.

After laminating this film on, the gloss of said molded body was 167 at a 60° angle of measurement and 100 at an 85° angle of measurement in all directions.

What is claimed is:

1. A process for producing an article having at least one surface which exhibits antireflection properties, comprising the step of:
   a) transferring to at least one surface of an article, a surface structure of a polymeric film, wherein said polymeric film comprises a thermoplastic material,
   said surface structure comprising individual, randomly distributed elevations, wherein said elevations rise 0.01 to 15 microns above the lowest regions of the surface having the elevations,
   so that the resultant article comprises a mirror image of said surface structure, wherein said surface structure has a substantially uniform configuration comprising mutually linked individual structures, wherein said surface structure comprises continually repeating elementary cells which have a mean diameter of about 10 to 800 microns,
   said transferring comprising transferring the surface structure of said film to said article by applying a surface of said film having said structure to said article, so as to form a mirror-image of said structure on said article, and, thereafter, optionally removing said film,
   wherein said elevations are formed by the presence of at least one of inorganic or organic additives in the film.

2. A process as claimed in claim 1, wherein both a surface of the film having said surface structure, which comes into contact with said article, and the treated surface of said article comprise the same type of polymer, and wherein said article comprises a molded body.

3. A process as claimed in claim 1, wherein said elevations rise 0.1 to 5 microns.

4. A process as claimed in claim 1, wherein said mean diameter is from 20 to 400 microns.

5. A process as claimed in claim 1, wherein the ratio of minimum to maximum diameter of the elementary cells is from 0.1 to 1.0.

6. A process as claimed in claim 1, wherein said film comprises a decorative layer and wherein said decorative layer is transferred partly or wholly to the surface of said article, so that the decorative layer is exposed in the resultant article.

7. A process as claimed in claim 1, wherein the article to be antireflection treated comprises a plastic panel and said film is a release film, wherein said release film is present on said article during the production of the panel.

8. A process as claimed in claim 1, wherein said polymeric film comprises a polyester.

9. The process as claimed in claim 8, wherein said polyester is selected from at least one of the group consisting of polyethylene terephthalate, polybutylene terephthalate, poly-1,4-cyclohexylene dimethylene terephthalate, polyethylene-2,6-naphthalene decarboxylate, and polyethylene p-hydroxybenzoate.

10. A process as claimed in claim 1, wherein the surface of said article to be treated comprises at least one of plastic, glass, ceramic, metal, paper, and cardboard.

11. The process as claimed in claim 1, wherein said additives comprise inert particles which have a mean diameter in the range from 0.001 to 5 μm, and are present in the structured film in an amount in the range from 0.005 to 5% by weight.

12. The process as claimed in claim 11, wherein said additives have a mean particle diameter of 0.05 to 2.5 μm and are present in the range from 0.005 to 1% by weight.

13. An article produced by a process according to claim 1.

14. A process as claimed in claim 1, wherein the article is a glass, metal, paper, cardboard, ceramic, or wood article.

15. A process as claimed in claim 14, wherein said film comprises at least two layers, wherein the outer layer of the film which is applied to said article is comprised of a polymer which has an adhesion-promoting action with respect to the article.

16. A process for producing an article having at least one surface which exhibits antireflection properties, comprising the step of:
   a) transferring to at least one surface of an article a surface structure of a polymeric film, wherein said polymeric film comprises a thermoplastic material,
   said surface structure comprising individual, randomly distributed elevations, wherein said elevations rise 0.01 to 15 microns above the lowest regions of the surface having the elevations,
   so that the resultant article comprises a mirror image of said surface structure, wherein said surface structure has a substantially uniform configuration comprising mutually linked individual structures, wherein said surface structure comprises continually repeating elementary cells which have a mean diameter of about 10 to 800 microns,
   said transferring comprising transferring the surface structure of said film to said article by applying a surface of said film having said structure to said article, so as to form a mirror-image of said structure on said article and, thereafter, optionally removing said film,
   wherein said film comprises a uniaxially or biaxially oriented film which has been heat-set.

17. A process for producing an article having at least one surface which exhibits antireflection properties, comprising the step of:
   a) transferring to at least one surface of an article, a surface structure of a polymeric film, wherein said polymeric film comprises a thermoplastic material,
   said surface structure comprising individual, randomly distributed elevations, wherein said elevations rise 0.01 to 15 microns above the lowest regions of the surface having the elevations,
   so that the resultant article comprises said surface structure, wherein said surface structure has a substantially uniform configuration comprising mutually linked individual structures, wherein said surface structure comprises continually repeating elementary cells which have a mean diameter of about 10 to 800 microns, said transferring comprising applying said film to said article as a cover layer wherein a surface of the film comprising said structure faces outward from said article, wherein the elevations are formed by the presence of at least one of inorganic or organic additives in the film.

* * * * *